US012618364B1

(12) United States Patent
Nagumantri et al.

(10) Patent No.: US 12,618,364 B1
(45) Date of Patent: May 5, 2026

(54) SYSTEM AND METHOD OF HEAT INTEGRATION FOR A GAS CAPTURE SYSTEM

(71) Applicant: GE Infrastructure Technology LLC, Greenville, SC (US)

(72) Inventors: Raman Venkata Satya Lova Nagumantri, Bangalore (IN); Peter John Murphy, Henrico, VA (US); Srikrishnan Ramchandran, Karnataka (IN); Muneeswara Babu Ummiti, Bengaluru (IN)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/000,219

(22) Filed: Dec. 23, 2024

(51) Int. Cl.
F02C 7/08 (2006.01)
F02C 7/10 (2006.01)
F02C 7/141 (2006.01)

(52) U.S. Cl.
CPC ................. F02C 7/08 (2013.01); F02C 7/10 (2013.01); F02C 7/141 (2013.01)

(58) Field of Classification Search
CPC .... F02C 7/08; F02C 7/10; F02C 7/141; F01K 23/08; F01K 23/10; F01K 17/025
See application file for complete search history.

(56) References Cited

U.S. PATENT DOCUMENTS

| | | | |
|---|---|---|---|
| 7,644,573 B2 | 1/2010 | Smith et al. | |
| 2010/0089023 A1* | 4/2010 | Harada | F01K 23/101 60/39.182 |
| 2013/0199202 A1 | 8/2013 | Zhang et al. | |
| 2013/0269346 A1* | 10/2013 | Li | F01K 17/04 60/645 |

FOREIGN PATENT DOCUMENTS

| | | | | |
|---|---|---|---|---|
| CN | 210829419 U | * | 6/2020 | Y02E 20/16 |
| WO | WO-2024039365 A1 | * | 2/2024 | B01D 53/1475 |

OTHER PUBLICATIONS

English translation of CN-210829419-U (Year: 2020).*

* cited by examiner

*Primary Examiner* — Thomas P Burke
(74) *Attorney, Agent, or Firm* — Fletcher Yoder, P.C.

(57) ABSTRACT
A system includes an intake heating system having one or more heat exchangers. The one or more heat exchangers are fluidly coupled to a steam turbine system, a gas turbine system, a carbon capture system, and a heat recovery steam generator (HRSG). The one or more heat exchangers are configured to receive steam from the HRSG, the steam turbine system, or a combination thereof. The one or more heat exchangers are also configured to receive an air. The one or more heat exchangers are also configured to place the steam in a heat exchange relationship with the air to produce a heated air and a cooled steam. The one or more heat exchangers are also configured to send the cooled steam to the carbon capture system. The one or more heat exchangers are also configured to send the heated air to one or more injection locations of the gas turbine system.

20 Claims, 3 Drawing Sheets

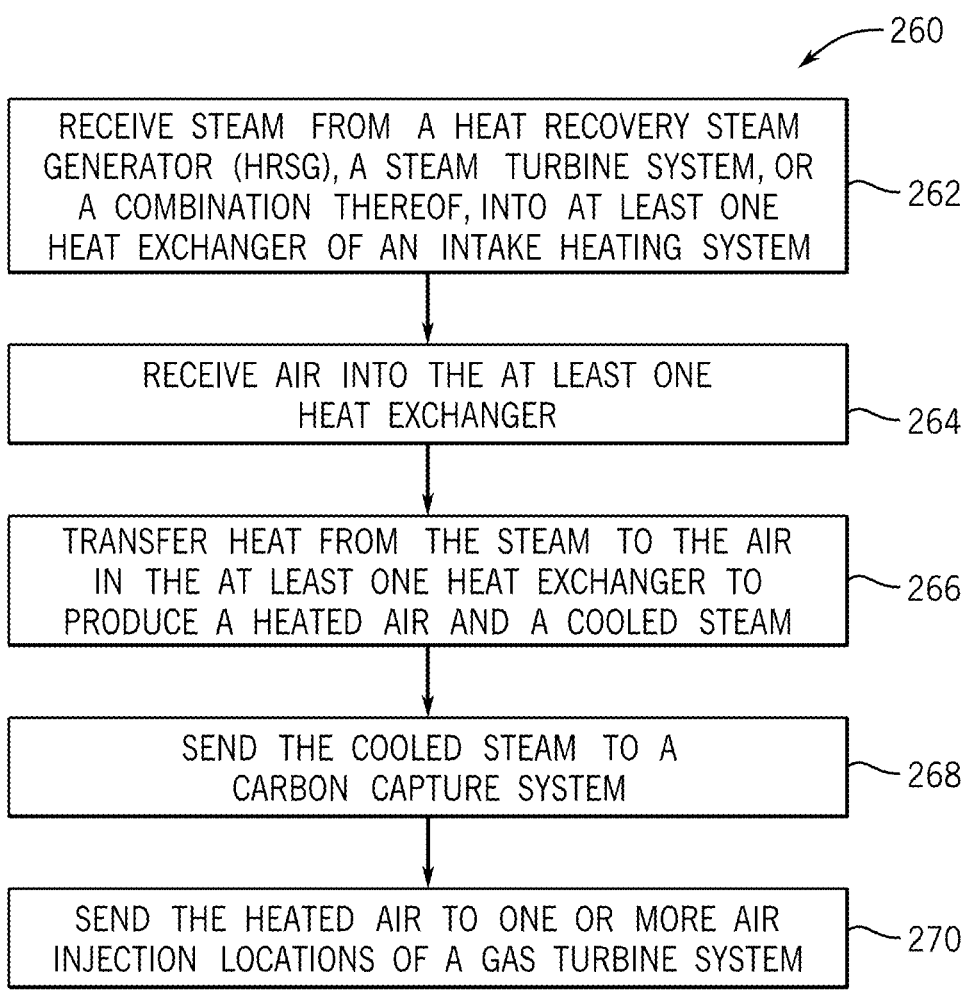

260

RECEIVE STEAM FROM A HEAT RECOVERY STEAM GENERATOR (HRSG), A STEAM TURBINE SYSTEM, OR A COMBINATION THEREOF, INTO AT LEAST ONE HEAT EXCHANGER OF AN INTAKE HEATING SYSTEM ~262

RECEIVE AIR INTO THE AT LEAST ONE HEAT EXCHANGER ~264

TRANSFER HEAT FROM THE STEAM TO THE AIR IN THE AT LEAST ONE HEAT EXCHANGER TO PRODUCE A HEATED AIR AND A COOLED STEAM ~266

SEND THE COOLED STEAM TO A CARBON CAPTURE SYSTEM ~268

SEND THE HEATED AIR TO ONE OR MORE AIR INJECTION LOCATIONS OF A GAS TURBINE SYSTEM ~270

FIG. 3

SYSTEM AND METHOD OF HEAT INTEGRATION FOR A GAS CAPTURE SYSTEM

BACKGROUND

The subject matter disclosed herein generally relates to a system and method for improving efficiency of an industrial plant having a combustion system and a gas treatment system.

Various undesirable gases pollute the atmosphere. For example, the undesirable gases may include carbon oxides ($CO_X$) such as carbon dioxide ($CO_2$) and carbon monoxide (CO), nitrogen oxides ($NO_X$) such as nitrogen dioxide ($NO_2$), and/or sulfur oxides ($SO_X$) such as sulfur dioxide ($SO_2$). With various regulations and environmental concerns regarding global warming, it would be desirable to reduce the undesirable gases (e.g., $CO_2$) in the atmosphere. An industrial plant may include a combined cycle system having a gas turbine system generating exhaust gas from combustion of a fuel, a heat recovery steam generator configured to generate steam from heat of the exhaust gas, and a steam turbine system driven by the steam. The combined cycle system may include a gas treatment system for reducing the undesirable gases; however, the gas treatment system may add costs and reduce efficiency of the plant. As such, there is a need for improving the efficiency of the gas treatment system used in the combined cycle system to remove undesirable gases from the atmosphere and/or from exhaust gases discharged into the atmosphere while maintaining an efficiency of remaining subsystems used in combined cycle system.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes an intake heating system having one or more heat exchangers. The one or more heat exchangers are fluidly coupled to a steam turbine system, a gas turbine system, a carbon capture system, and a heat recovery steam generator (HRSG). The one or more heat exchangers are configured to receive steam from the HRSG, the steam turbine system, or a combination thereof. The one or more heat exchangers are also configured to receive an air. The one or more heat exchangers are also configured to place the steam in a heat exchange relationship with the air to produce a heated air and a cooled steam. The one or more heat exchangers are also configured to send the cooled steam to the carbon capture system. The one or more heat exchangers are also configured to send the heated air to one or more injection locations of the gas turbine system.

In certain embodiments, a system includes a gas turbine system, a heat recovery steam generator (HRSG), a steam turbine system, a carbon capture system, and an intake heating system having one or more heat exchangers. The one or more heat exchangers are configured to receive steam from the HRSG, the steam turbine system, or a combination thereof. The one or more heat exchangers are also configured to receive an air. The one or more heat exchangers are also configured to place the steam in a heat exchange relationship with the air to produce a heated air and a cooled steam. The one or more heat exchangers are also configured to send the cooled steam to the carbon capture system. The one or more heat exchangers are also configured to send the heated air to one or more injection locations of the gas turbine system.

In certain embodiments, a method includes receiving steam from a heat recovery steam generator (HRSG), a steam turbine system, or a combination thereof, into at least one heat exchanger of an intake heating system. The method also includes receiving air into the at least one heat exchanger. The method also includes transferring heat from the steam to the air in the at least one heat exchanger to produce a heated air and a cooled steam. The method also includes sending the cooled steam to a carbon capture system. The method also includes sending the heated air to one or more injection locations of a gas turbine system.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein:

FIG. 3 is an embodiment of a process for operating the intake heating system, in accordance with embodiments described herein.

DETAILED DESCRIPTION

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards an intake heating system (e.g., intake air heating system) for an industrial plant having a combined cycle system. The intake heating system receives steam from a heat recovery steam generator (HRSG), a steam turbine system, or a combination thereof. The intake heating system also receives air (e.g., ambient air) from the surrounding environment and/or an air source. The intake heating system places the steam in a heat exchange relationship with the air and transfers heat from the steam to the air, thereby producing heated air and cooled steam. The intake heating system sends the heated air to an intake system fluidly coupled to a compressor of a gas turbine system of the combined cycle system. The intake heating system sends the cooled steam to a carbon capture system of the combined cycle system. As disclosed herein, the intake heating system may include one or more heat exchangers. The intake heating system may eliminate the need for an attemperator otherwise used to attemperate the steam for use in the carbon capture system, and thus the intake heating system serves dual purposes of both heating the air for the gas turbine system and also attemperating the steam for the carbon capture system.

Figure 1:
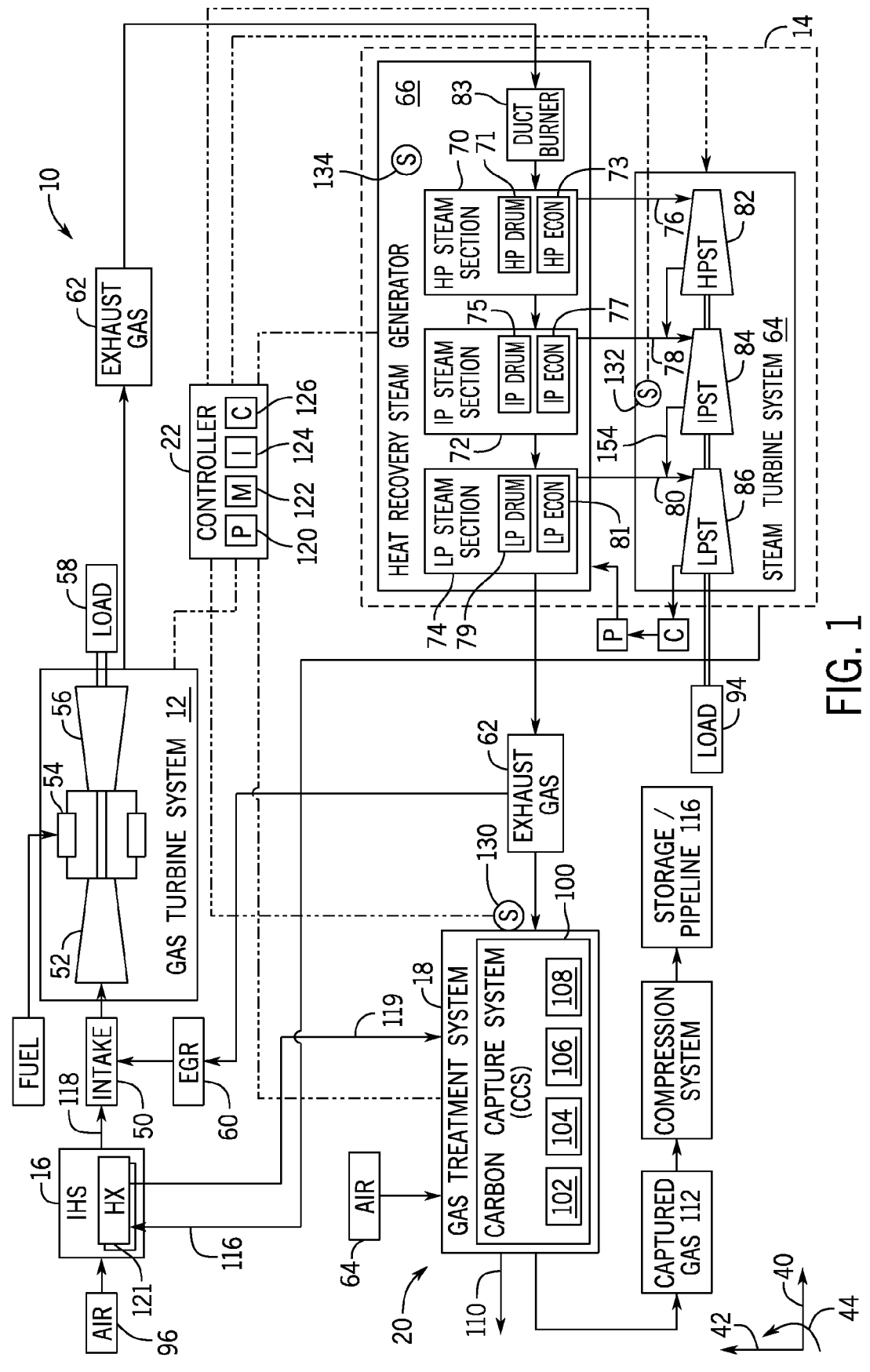
FIG. 1 is a block diagram of an embodiment of a combined cycle system having an intake heating system, in accordance with embodiments described herein.

With the foregoing in mind, FIG. 1 is a block diagram of an embodiment of an industrial plant 10 having a gas turbine system 12, an energy recovery system 14, an intake heating system 16, a gas treatment system 18 having one or more gas capture systems 20, and a controller 22 coupled to each of the systems 12, 14, 16, and 18. As discussed below, the one or more gas capture systems 20 of the gas treatment system 18 are configured to capture an undesirable gas (e.g., $CO_2$) from exhaust gas and/or air (e.g., direct air capture). The gas capture system 20 of the industrial plant 10 includes a carbon capture system 100 for use in capturing undesirable gases (e.g., $CO_2$) from the exhaust gas of the combustion systems, air from the atmosphere, or a combination thereof. It should be noted that the gas capture system 20 (e.g., carbon capture system 100) may not be necessarily coupled to the gas treatment system 12. In certain embodiments, the carbon capture system 100 may be independent or separate from the industrial plant 10, such as a standalone carbon capture system 100 used for direct air capture. Furthermore, the carbon capture system 100 also includes a heating source and a cooling source. Before discussing details of the gas treatment system 18, various aspects of the industrial plant 10 are discussed in further detail. For purposes of orientation in the drawings, reference may be made to an axial direction or axis 40, a radial direction or axis 42 extending radially away from the axial direction or axis 40, and a circumferential direction or axis 44 extending circumferentially around the axial direction or axis 40. The directions or axes 40, 42, and 44 may be in reference to a rotational axis 36 of the gas turbine system 12, for example.

The gas turbine system 12 includes an air intake 50, a compressor 52 having one or more compressor stages, one or more combustors 54, a turbine 56 having one or more turbine stages, and a load 58 (e.g., electrical generator) driven by the turbine 56. In certain embodiments, the gas turbine system 12 further includes an exhaust gas recirculation (EGR) system 60 configured to recirculate an exhaust gas 62 into the air intake 50. The recirculated exhaust gas 62 helps to reduce the temperature and formation of certain emissions (e.g., nitrogen oxides ($NO_x$)) associated with combustion in the combustors 54. In operation, the compressor 52 receives air (and also exhaust gas 62 if the EGR system 60 is active) from the air intake 50, and compresses the air and/or exhaust gas 62 in one or more compressor stages (e.g., stages of rotating compressor blades). The combustors 54 then combust fuel from a fuel supply system with the compressed air and/or exhaust gas and generate hot combustion gases. The hot combustion gases expand and drive one or more turbine stages (e.g., stages of rotating turbine blades) in the turbine 56, thereby driving rotation of the compressor 52 and the load 58 via shafts. The turbine 56 then outputs the hot combustion gases as the exhaust gas 62. The gas turbine system 12 may include a variety of piping to support the flow of intake air, compressed air (e.g., bleed air), one or more fuels (e.g., liquid fuel, gas fuel, etc.), additives for combustion, exhaust gas (e.g., exhaust gas recirculation), or other fluids.

The energy recovery system 14 includes a steam turbine system 64 and a heat recovery steam generator (HRSG) 66. The HRSG 66 recovers waste heat from the exhaust gas 62 to generate steam for driving the steam turbine system 64. The HRSG 66 includes a high-pressure (HP) steam section 70, an intermediate-pressure (IP) steam section 72, and a low-pressure (LP) steam section 74 configured to generate HP steam 76, IP steam 78, and LP steam 80. As shown, the HP steam section 70 includes an HP drum 71 and an HP economizer 73, the IP steam section 72 includes an IP drum 75 and an IP economizer 77, and the LP steam section 74 includes an LP drum 79 and an LP economizer 81. As shown, the HRSG 66 includes a duct burner 83 configured to heat the exhaust gas 62 entering the HRSG 66. The duct burner 83 combusts a fuel with an oxidant (e.g., oxygen, air, etc.) in the exhaust gas 62, thereby adding heat to the exhaust gas 62 prior to heat recovery from the exhaust gas 62 in the HRSG 66.

As shown, the steam turbine system 64 may include an HP steam turbine 82 driven by the HP steam 76, an IP steam turbine 84 driven by the IP steam 78, and an LP steam turbine 86 driven by the LP steam 80. In certain embodiments, the HP steam turbine 82 receives the HP steam 76 from the HP economizer 73, the IP steam turbine 84 receives the IP steam 78 from the IP economizer 77, and the LP steam turbine 86 receives the LP steam 80 from the LP economizer 81. In addition to the steam provided by the HRSG 66, the HP steam turbine 82 provides IP steam 78 to the IP steam turbine 84, and the IP steam turbine 84 provides LP steam to the LP steam turbine 86. In operation, the steam turbine system 64 drives a load 94 (e.g., electrical generator) via a shaft. In certain embodiments, the steam turbine system 64 and/or the HRSG 66 may provide heated water and/or steam (e.g., HP steam 76, IP steam 78, and/or LP steam 80) to the gas treatment system 18 to support a desorption mode of the one or more gas capture systems 20. For example, the gas capture systems 20 may receive heated water and/or steam in a temperature range of 100 to 150 degrees Celsius, 110 to 150 degrees Celsius, 120 to 150 degrees Celsius, or 130 to 150 degrees Celsius. The steam turbine system 64 and the HRSG 66 may include a variety of piping to support the flow of exhaust gas, steam, water, or other fluids, thereby facilitating waste heat recovery, steam generation, and steam power.

After the HRSG 66, the exhaust gas 62 may flow to the EGR system 60 and/or the gas treatment system 18. In the illustrated embodiment, the exhaust gas 62 flows through one or more gas capture systems 20 configured to capture undesirable gases. In some embodiments, the gas capture systems 20 may receive air 96 from an additional source (e.g., environment, fans, and the like). For example, the air 96 may be atmospheric air when the gas capture system 20 is configured as a direct air capture (DAC) system. The undesirable gases from the exhaust gas 62 and/or the air 96 may include carbon oxides ($CO_x$) (e.g., carbon dioxide ($CO_2$) and carbon monoxide (CO)), nitrogen oxides ($NO_x$) (e.g., nitrogen dioxide ($NO_2$)), sulfur oxides ($SO_x$) (e.g., sulfur dioxide ($SO_2$)), or any combination thereof. In the following discussion, $CO_2$ may be used as an example of the undesirable gases; however, the gas capture systems 20 may be designed to capture any of the foregoing undesirable gases. For example, the gas capture systems 20 include one or more carbon capture systems 100 (e.g., $CO_2$ capture systems).

In some embodiments, the gas capture systems 20 (e.g., carbon capture systems 100) may include sorbent-based gas capture systems, solvent-based gas capture systems, cryogenic gas capture systems, or any combination thereof, configured to remove and capture undesirable gases. The carbon capture system 100 may include components 102, 104, 106, and 108 configured to enable gas capture of undesirable gases (e.g., $CO_2$) from the exhaust gas 62, thereby outputting a treated gas 110 and a captured gas 112 (e.g., $CO_2$).

In certain embodiments, the carbon capture system 100 is a sorbent-based carbon capture system, and the components 102, 104, 106, and/or 108 include multiple sorbent-based carbon capture units (e.g., adsorbers). For example, the sorbent-based carbon capture units may include temperature swing adsorption (TSA) units or adsorbers, wherein a temperature swing or change is used to sequentially operate in an adsorption mode, a desorption mode, and a cooling mode at different temperatures. In the adsorption mode, the adsorber is configured to adsorb undesirable gases (e.g., $CO_2$) into sorbent material at a first temperature. In the desorption mode, the adsorber is configured to desorb the undesirable gases (e.g., $CO_2$) from the sorbent material, for example, by heating the sorbent material from the first temperature to a higher second temperature using a heat source. The heat source may include a heated fluid, such as a heated gas and/or liquid (e.g., the cooled steam 119). In the cooling mode, the adsorber is cooled in preparation for the next adsorption mode.

In certain embodiments, the carbon capture system 100 is a solvent-based carbon capture system, and the components 102, 104, 106, and/or 108 include one or more absorbers, strippers, and associated equipment. For example, the absorber is configured to absorb undesirable gases (e.g., $CO_2$) into a solvent during an absorption mode (e.g., absorption stage), thereby outputting the treated gas 110 through an exhaust stack and a $CO_2$-rich solvent to the stripper. The stripper is configured to apply heat to the $CO_2$-rich solvent during a desorption mode (e.g., stripping stage), thereby stripping the undesirable gases (e.g., $CO_2$) from the solvent to produce the captured gas 112 and a $CO_2$-lean solvent. The stripper may receive heat via a heat source, such as a heated gas and/or liquid (e.g., the cooled steam 119). The stripper returns the $CO_2$-lean solvent to the absorber to repeat the cycle.

In the illustrated embodiment, the intake heating system 16 receives the air 96 (e.g., from the atmosphere, from an air source, etc.). The air 96 may include atmospheric air, compressed air, treated air, or a combination thereof. The intake heating system 16 also receives steam 116 from the energy recovery system 14. The steam 116 may be received (e.g., extracted, bled or siphoned) from the steam turbine system 64 and/or the HRSG 66. As discussed in further detail herein, the intake heating system 16 places the air 96 in a heat exchange relationship with the steam 116 to produce a heated air 118 and a cooled steam 119. The heat exchange relationship may include one or more heat exchangers 121 (e.g., indirect heat exchanger, shell and tube heat exchanger, printed circuit heat exchanger, etc.) for an indirect heat transfer between the air 96 and the steam 116. In certain embodiments, the heat exchangers 121 may include 2, 3, 4, 5, 6, 7, 8, 9, 10 or more heat exchangers arranged in series and/or in parallel. For example, each heat exchanger 121 may include an air flow path and a steam flow path, wherein the air flow path and the steam flow path are separate from one another (e.g., separated by walls of tubes, enclosures, etc.) while enabling heat transfer. Thus, the heat exchanger 121 indirectly transfers heat from the steam flow path to the air flow path, thereby heating the air 96 along the air flow path to generate the heated air 118 while cooling the steam 116 along the steam flow path to generate the cooled steam 119. In certain embodiments, the heat exchange relationship (e.g., heat exchangers 121) may eliminate an attemperator used to cool the steam 116 for use in the gas capture system 20 (e.g., carbon capture system 100), wherein the attemperator removes heat from the steam 116 but does not use the heat for any other purpose (e.g., wasted heat). As shown, the intake heating system 16 sends the heated air 118 to the gas turbine system 12 (e.g., via the intake 50), for example, to help inhibit ice formation, control the temperature of intake air being compressed in the compressor 52, and/or control the efficiency of the gas turbine system 12. The intake heating system 16 also sends the cooled steam 119 to the carbon capture system 100, for example, to help capture undesirable gases (e.g., $CO_2$). Thus, in the illustrated embodiment, the heat exchange relationship (e.g., heat exchangers 121) advantageously provides heat integration (e.g., heat transfer) between the intake heating system 116, the energy recovery system 14, and the gas capture system 20 (e.g., carbon capture system 100), thereby using otherwise wasted heat by integrating the systems 116, 14, and 20.

In the illustrated embodiment, the controller 22 is configured to control all aspects of the industrial plant 10. The controller 22 includes one or more processors 120, memory 122, instructions 124 stored on the memory 122 and executable by the processor 120, and communication circuitry 126 configured to communicate with sensors and various equipment of the industrial plant 10. For example, the controller 22 is configured to receive sensor feedback from one or more sensors 128 coupled to the gas turbine system 12, the steam turbine system 64, the HRSG 66, and the gas treatment system 18 (e.g., gas capture systems 20), and/or additional components of the industrial plant 10 and control the same equipment based on the sensor feedback, operating modes, user input, computer models, or any combination thereof. The sensors 128 may include temperature sensors, pressure sensors, flow rate sensors, gas composition sensors, or any combination thereof.

In the illustrated embodiment, the gas capture systems 20 may include one or more sensors 130 communicatively coupled to the controller 22. The one or more sensors 130 may be configured to measure one or more parameters associated with the cooled steam 119 entering the gas treatment system 18 (e.g., carbon capture system 100) from the intake heating system 16. In certain embodiments, the one or more sensors 130 may measure a pressure, temperature, a flowrate, a steam saturation, or a combination thereof, associated with the cooled steam 119. In certain embodiments, the controller 22 may control a parameter associated with the air 96 and/or the steam 116 sent to the intake heating system 16 in response to a change in one or more estimated parameters of the cooled steam 119 based on a signal received by the controller 22 from the one or more sensors 130.

Additionally or alternatively, the steam turbine system 64 may include one or more sensors 132 communicatively coupled to the controller 22. The one or more sensors 132 may be configured to measure one or more parameters of the steam 116 sent to the intake heating system 16. For example, the one or more sensors 132 may measure a pressure, a temperature, a flow rate, a steam saturation, or any combination thereof, of the steam 116. Additionally or alternatively, the HRSG 66 may include one or more sensors 134 communicatively coupled to the controller 22. The one or more sensors 134 may be configured to measure one or more parameters of the steam 116 sent to the intake heating system 16. For example, the one or more sensors 134 may measure a pressure, a temperature, a flow rate, a steam saturation, or any combination thereof, of the steam 116.

In certain embodiments, the controller 22 may be configured to control a temperature of the heated air 118 to be within a temperature threshold (e.g., upper and lower temperature thresholds) and a temperature of the cooled steam 119 to be within a temperature threshold (e.g., upper and lower temperature thresholds) by controlling the heat exchange in the intake heating system 16, such as by controlling sensed parameters of the steam 116 supplied into the intake heating system 16 for heat transfer with the air 96 supplied into the intake heating system 16. As noted above, the upper and lower temperature thresholds for the cooled steam 119 may be 100 to 150 degrees Celsius, 110 to 150 degrees Celsius, 120 to 150 degrees Celsius, or 130 to 150 degrees Celsius. For example, the controller 22 may selectively control one or more valves on steam extraction conduits to control the steam extraction locations from the steam turbine system 64 and/or the HRSG 66, thereby selectively controlling properties of the steam 116 (e.g., temperature, pressure, flow rate, steam saturation, etc.) being supplied to the intake heating system 16. For example, the controller 22 may selectively open valves to enable a flow of LP steam from the steam turbine system 64 and/or the HRSG 66 if a low level of heating is needed for the air 96, the controller 22 may selectively open valves to enable a flow of IP steam from the steam turbine system 64 and/or the HRSG 66 if an intermediate level of heating is needed for the air 96, and/or the controller 22 may selectively open valves to enable a flow of HP steam from the steam turbine system 64 and/or the HRSG 66 if a high level of heating is needed for the air 96.

Figure 2:
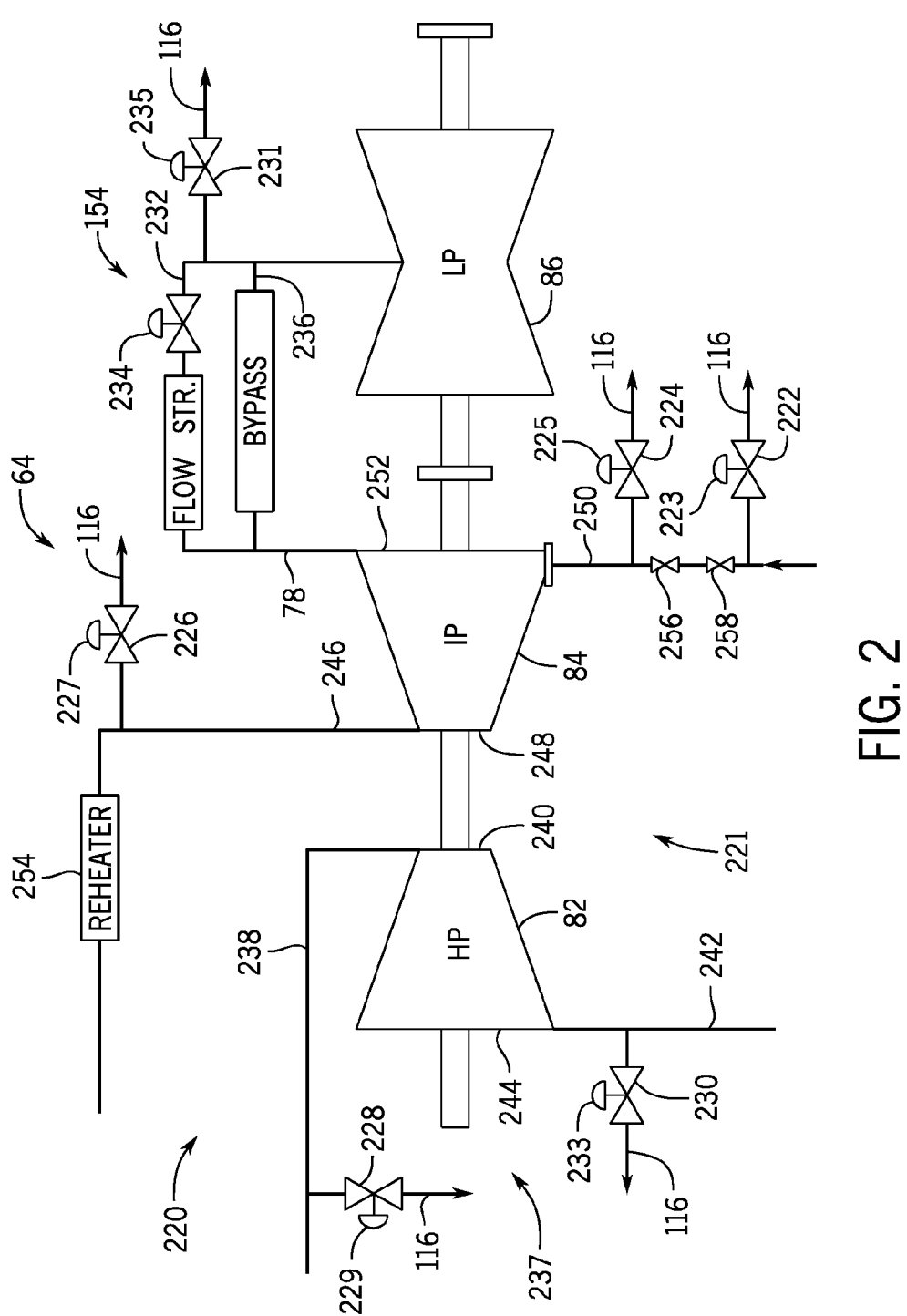
FIG. 2 is a block diagram of an embodiment of a steam turbine having a plurality of tap-off locations for transferring steam to the intake heating system, in accordance with embodiments described herein.

FIG. 2 is a block diagram of an embodiment of the steam turbine system 64 having a plurality of tap-off valves 220 (e.g., tap-off valves 222, 224, 226, 228, 230, and 231) for transferring the steam 116 to the intake heating system 16. In certain embodiments, the tap-off valves 220 may be actuated via actuators 221 (e.g., actuators 223, 225, 227, 229, 233, 235) that are communicatively coupled to the controller. In the illustrated embodiment, the steam turbine system 64 includes the HP steam turbine 82, the IP steam turbine 84, and the LP steam turbine 86. As shown, the steam turbine system 64 includes the cross-over line 154 fluidly coupled to the LP steam turbine 86 and the IP steam turbine 84. In the illustrated embodiment, the IP steam 78 flows from the IP steam turbine 84 to the LP steam turbine 86 through the cross-over line 154. As shown, the cross-over line 154 includes a flow line 232 (e.g., fluid conduit) having a butterfly valve 234, and a bypass line 236 (e.g., fluid conduit) in parallel with the flow line 232.

In the illustrated embodiment, the steam turbine system 64 also includes lines 237 (e.g., fluid conduits) that transport steam 116 to and/or from the steam turbine system 64. The lines 237 include an HP inlet line 238 fluidly coupled to an HP inlet portion 240 of the HP steam turbine 82, and an HP outline line 242 fluidly coupled to an HP outlet portion 244 of the HP steam turbine 82. As shown, the lines 237 also include an IP inlet line 246 fluidly coupled to an IP inlet portion 248 of the IP steam turbine 84, and an IP outlet line

250 fluidly coupled to an IP outlet portion 252 of the IP steam turbine 84. The IP inlet line 246 includes a reheater 254, and the IP outlet line 250 includes a first flow control valve 256 and a second flow control valve 258. In certain embodiments, the HP outlet line 242 may be fluidly coupled to the reheater 254 disposed on the IP inlet line 246.

As shown, the tap-off valves 220 are disposed on the lines 237. The tap-off valve 222 is disposed upstream (e.g., steam 116 flowing into the IP steam turbine 84) of the first flow control valve 256 and the second flow control valve 258. The tap-off valve 224 is disposed downstream (e.g., steam 116 flowing into the IP steam turbine 84) of the first flow control valve 256 and the second flow control valve 258. The tap-off valve 226 is disposed downstream (e.g., steam 116 flowing into the IP steam turbine 84) of the reheater 254. The tap-off valve 228 is disposed on the HP inlet line 238 and a tap-off valve 230 is disposed on the HP outlet line 242. A tap-off valve 231 is disposed on the cross-over line 154.

In certain embodiments, the controller 22 may selectively control the tap-off valves 220 based on an operating condition of the operating parameter of the gas turbine system 12. For example, in response to the gas turbine system 12 is operating at full load, the controller 22 may extract the steam 116 from the cross-over line 154 via the tap-off valve 231 and/or from the IP outlet line 250 via tap-off valves 222, 224. Additionally or alternatively, in response to the gas turbine system 12 operating at part load, the controller 22 may extract the steam 116 from any combination of the tap-off valves 220. For example, in the part load, the controller 22 may extract the steam 116 from the tap-off valves 228 and/or 230. In certain embodiments, the controller 22 may extract the steam 116 from the tap-off valves 220 at generally higher pressure locations during the part load and generally lower pressure locations during the full load, partially due to changes in waste heat recovery, steam production, etc. when operating at different load conditions. In certain embodiments, the controller 22 may control the butterfly valve 234 and/or the tap-off valves 220 in order to control a pressure of the steam 116. It may be appreciated that any combination of the tap-off valves 220 may be used for transferring the steam 116 to the intake heating system 16. Additionally, it may be recognized that the tap-off valves 220 described herein may be used in combination with the intake heating system 16 configuration described in FIG. 1. In certain embodiments, the controller 22 may be configured to control one or more valves to extract and deliver steam to the intake heating system 16 from any of the steam sections 70, 72, and 74 of the HRSG 66 and any of the steam turbines 82, 84, and 96 of the steam turbine system 64 at suitable steam pressures (e.g., IP, LP, and/or HP steam) depending on operating conditions of the gas turbine system 12 (e.g., startup, full load, part load, shut down, etc.), temperature thresholds for the air temperature, temperature thresholds for the steam supplied to the carbon capture system 100, or any combination thereof.

FIG. 3 is a flowchart of an embodiment of a process 260 of operating the intake heating system 16. The process 260 may be performed by a computing device or controller (e.g., controller 22) disclosed above with reference to FIGS. 1 and 2 or any other suitable computing device(s) or controller(s). Furthermore, the blocks of the process 260 may be performed in the order disclosed herein or in any other suitable order. For example, certain blocks of the process 260 may be performed concurrently. In addition, in certain embodiments, at least one of the blocks of the process 260 may be omitted.

In block 262 of the process 260, the intake heating system 16 may receive the steam 116 from the HRSG 66, the steam turbine system 64, or a combination thereof into the at least one heat exchanger 121 of the intake heating system 16. As described herein, the steam may be received from a cross-over line 154 between the LP steam turbine 86 and the IP steam turbine 84, one or more locations of the one or more tap-off valves 220, and/or from the HRSG 66.

In block 264 of the process 260, the intake heating system 16 may receive the air 96 into the at least one heat exchanger 121. In certain embodiments, the air 96 may be received from an air source (e.g., air tank, air pipe line, etc.). As discussed herein, the air 96 may include ambient (e.g., atmospheric) air, compressed air, filtered air, or a combination thereof.

In block 266 of the process 260, the intake heating system 16 may transfer heat from the steam 116 to the air 96 to produce the heated air 118 and the cooled steam 119. In certain embodiments, the intake heating system 16 may transfer heat from the steam 116 to the air 96 using one or more heat exchangers 121. In certain embodiments, two or more heat exchangers 121 may be arranged in a series configuration relative to a direction of flow of the steam 116. Additionally or alternatively, two or more heat exchangers 121 or may be arranged in a parallel configuration relative to the direction of flow of the air 96 and the steam 116.

In the block 268 of the process 260, the intake heating system 16 may send the cooled steam 119 to the carbon capture system 100. In certain embodiments, the cooled steam 119 may be used to sweep one or more vessels containing sorbent material of the carbon capture system 100 (e.g., sorbent-based carbon capture system) during a desorption stage, thereby removing undesirable gases (e.g., $CO_2$) from the sorbent material. In certain embodiments, the cooled steam 119 may be used in a stripper and/or a reboiler of the carbon capture system 100 (e.g., solvent-based carbon capture system), thereby helping to strip the undesirable gases (e.g., $CO_2$) from the solvent circulating between the stripper and an absorber of the solvent-based carbon capture system. In certain embodiments, one or more sensors 132 and/or one or more sensors 134 may monitor a pressure, temperature, and/or flowrate of the cooled steam 119 entering the carbon capture system 100 and send a signal to the controller 22 indicative of the monitored pressure, temperature, and/or flowrate of the cooled steam 119.

In the block 270 of the process 260, the intake heating system 16 may send the heated air 118 to the intake 50 of the gas turbine system 12. In certain embodiments, the heated air 118 is sent directly to the gas turbine system 12. In certain embodiments, the intake heating system 16 may heat the air 96 until a temperature of the heated air 118 is above a threshold temperature and/or within upper and lower temperature thresholds.

Technical effects of the disclosed embodiments include utilizing steam from a steam turbine system, an HRSG, or a combination thereof, to heat air used for a gas turbine system and concurrently cool the steam for use in a carbon capture system. Thus, the disclosed embodiments provide heat integration (e.g., heat transfer) between the intake heating system and the carbon capture system via the steam, wherein the intake heating system transfers heat away from the steam to both heat the air and also cool the steam suitable for the carbon capture system. In this way, the intake heating system (e.g., via one or more heat exchangers) may eliminate a steam attemperator that would otherwise be used to attemperate the steam prior to the carbon capture system, such as by discharging the heat to the environment (e.g., waste heat).

Instead, the intake heating system uses that otherwise wasted heat to heat the air for the gas turbine system, while cooling the steam for the carbon capture system (e.g., gas treatment system). In this manner, the disclosed embodiments eliminate components and costs (e.g., steam attemperator) and increase efficiency of the industrial plant. Additionally or alternatively, the part load performance (e.g., heat rate) may be improved and the amount of emissions released to the environment will be reduced. Additionally, the disclosed embodiments may be implemented in new combined cycle power plants and/or retrofitted to existing combined cycle power plants.

The subject matter described in detail above may be defined by one or more clauses, as set forth below.

According to a first aspect, a system includes an intake heating system having one or more heat exchangers. The one or more heat exchangers are fluidly coupled to a steam turbine system, a gas turbine system, a carbon capture system, and a heat recovery steam generator (HRSG). The one or more heat exchangers are configured to receive steam from the HRSG, the steam turbine system, or a combination thereof. The one or more heat exchangers are also configured to receive an air. The one or more heat exchangers are also configured to place the steam in a heat exchange relationship with the air to produce a heated air and a cooled steam. The one or more heat exchangers are also configured to send the cooled steam to the carbon capture system. The one or more heat exchangers are also configured to send the heated air to one or more injection locations of the gas turbine system.

The system of the preceding clause, wherein the one or more heat exchangers are configured to receive the steam from a cross-over line between an intermediate pressure steam turbine of the steam turbine system and a low pressure steam turbine of the steam turbine system.

The system of any preceding clause, including one or more sensors configured to monitor one or more parameters of the cooled steam sent to the carbon capture system.

The system of any preceding clause, wherein the HRSG includes a low pressure economizer, and the steam turbine system is configured to receive the steam from the low pressure economizer.

The system of any preceding clause, including a controller having a memory and a processor, wherein the controller is configured to: control one or more actuators to cause the steam to flow from the cross-over line to the one or more heat exchangers in response to the gas turbine system operating at a full load; control the one or more actuators to cause the steam to flow from one or more lines coupled to a high pressure steam turbine of the steam turbine system, the intermediate pressure steam turbine, or a combination thereof in response to the gas turbine system operating at a part load; or a combination thereof.

The system of any preceding clause, wherein the one or more lines include: a first inlet line coupled to an inlet portion of the high pressure steam turbine; a first outlet line coupled to an outlet portion of the high pressure steam turbine; a second inlet line coupled to an inlet portion of the intermediate pressure steam turbine; a second outlet line coupled to an outlet portion of the intermediate pressure steam turbine; or a combination thereof.

The system of any preceding clause, wherein the first outlet line is configured to transfer the steam from the high pressure steam turbine to a reheater, and the second inlet line is configured to transfer the steam from the reheater to the intermediate pressure steam turbine.

The system of any preceding clause, wherein the first inlet line, the first outlet line, the second inlet line, the second outlet line, or the combination thereof, includes one or more valves configured to regulate flow of the steam to the one or more heat exchangers, wherein the controller is configured to selectively actuate the one or more valves.

The system of any preceding clause, wherein the one or more heat exchangers are configured to selectively receive the steam from a plurality of extraction locations via a plurality of valves controlled by a controller, wherein the plurality of extraction locations include at least three of a low pressure section of the HRSG, an intermediate pressure section of the HRSG, a high pressure section of the HRSG, a low pressure steam turbine, an intermediate pressure steam turbine, a high pressure steam turbine, a crossover line between steam turbines of the steam turbine system, or any combination thereof.

According to a second aspect, a system includes a gas turbine system, a heat recovery steam generator (HRSG), a steam turbine system, a carbon capture system, and an intake heating system having one or more heat exchangers. The one or more heat exchangers are configured to receive steam from the HRSG, the steam turbine system, or a combination thereof. The one or more heat exchangers are also configured to receive an air. The one or more heat exchangers are also configured to place the steam in a heat exchange relationship with the air to produce a heated air and a cooled steam. The one or more heat exchangers are also configured to send the cooled steam to the carbon capture system. The one or more heat exchangers are also configured to send the heated air to one or more injection locations of the gas turbine system.

The system of the preceding clause, wherein the one or more heat exchangers is configured to receive the steam from a cross-over line between an intermediate pressure steam turbine of the steam turbine system and a low pressure steam turbine of the steam turbine system.

The system of any preceding clause, including one or more sensors configured to monitor one or more parameters of the cooled steam sent to the carbon capture system.

The system of any preceding clause, wherein the steam turbine system includes a low pressure economizer, and the steam turbine system is configured to receive the steam from the low pressure economizer.

The system of any preceding clause, including a controller having a memory and a processor, wherein the controller is configured to: control one or more actuators to cause the steam to flow from the cross-over line to the one or more heat exchangers in response to the gas turbine operating at a full load; control the one or more actuators to cause the steam to flow from one or more lines coupled to a high pressure steam turbine of the steam turbine, the intermediate pressure steam turbine, or a combination thereof in response to the gas turbine operating at a part load; or a combination thereof.

The system of any preceding clause, wherein the one or more lines include: a first inlet line coupled to an inlet portion of the high pressure steam turbine; a first outlet line coupled to an outlet portion of the high pressure steam turbine; a second inlet line coupled to an inlet portion of the intermediate pressure steam turbine; a second outlet line coupled to an outlet portion of the intermediate pressure steam turbine; or a combination thereof.

The system of any preceding clause, wherein the first outlet line is configured to transfer the steam from the high pressure steam turbine to a reheater, and the second inlet line is configured to transfer the steam from the reheater to the intermediate pressure steam turbine.

The system of any preceding clause, wherein the first inlet line, the first outlet line, the second inlet line, the second outlet line, or the combination thereof, includes one or more valves configured to regulate flow of the steam to the one or more heat exchangers, wherein the controller is configured to selectively actuate the one or more valves.

The system of claim 10, wherein the one or more heat exchangers are configured to selectively receive the steam from a plurality of extraction locations via a plurality of valves controlled by a controller, wherein the plurality of extraction locations comprise at least three of a low pressure section of the HRSG, an intermediate pressure section of the HRSG, a high pressure section of the HRSG, a low pressure steam turbine, an intermediate pressure steam turbine, a high pressure steam turbine, a crossover line between steam turbines of the steam turbine system, or any combination thereof.

According to a third aspect, a method includes receiving steam from a heat recovery steam generator (HRSG), a steam turbine system, or a combination thereof, into at least one heat exchanger of an intake heating system. The method also includes receiving air into the at least one heat exchanger. The method also includes transferring heat from the steam to the air in the at least one heat exchanger to produce a heated air and a cooled steam. The method also includes sending the cooled steam to a carbon capture system. The method also includes sending the heated air to one or more injection locations of a gas turbine system.

The method of the preceding clause, including capturing a carbon dioxide ($CO_2$) from the air and/or an exhaust gas from the gas turbine system, wherein capturing includes using the cooled steam during a desorption mode of the carbon capture system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
an intake heating system comprising one or more heat exchangers, wherein the one or more heat exchangers are configured to fluidly couple to a steam turbine system, a gas turbine system, a carbon capture system, and a heat recovery steam generator (HRSG), wherein the one or more heat exchangers are configured to:
receive steam from the HRSG, the steam turbine system, or a combination thereof;
receive an air;
place the steam in a heat exchange relationship with the air to produce a heated air and a cooled steam;
send the cooled steam to the carbon capture system; and
send the heated air to an injection location of the gas turbine system; and
a controller comprising a memory and one or more processors, wherein the controller is configured to:
adjust one or more parameters of the steam to:

maintain a first temperature of the heated air between a first lower temperature threshold and a first upper temperature threshold; and maintain a second temperature of the cooled steam between a second lower temperature threshold and a second upper temperature threshold.

2. The system of claim 1, wherein the one or more heat exchangers are configured to receive the steam from a cross-over line between an intermediate pressure steam turbine of the steam turbine system and a low pressure steam turbine of the steam turbine system.

3. The system of claim 1, comprising one or more sensors configured to monitor one or more parameters of the cooled steam sent to the carbon capture system.

4. The system of claim 2, wherein the controller is configured to:

control one or more actuators to cause the steam to flow from the cross-over line to the one or more heat exchangers in response to the gas turbine system operating at a full load;

control the one or more actuators to cause the steam to flow from one or more lines coupled to a high pressure steam turbine of the steam turbine system, the intermediate pressure steam turbine, or a combination thereof, in response to the gas turbine system operating at a part load;

or a combination thereof.

5. The system of claim 4, wherein the one or more lines comprise:

a first inlet line coupled to an inlet portion of the high pressure steam turbine;

a first outlet line coupled to an outlet portion of the high pressure steam turbine;

a second inlet line coupled to an inlet portion of the intermediate pressure steam turbine;

a second outlet line coupled to an outlet portion of the intermediate pressure steam turbine;

or a combination thereof.

6. The system of claim 5, wherein the first outlet line is configured to transfer the steam from the high pressure steam turbine to a reheater, and the second inlet line is configured to transfer the steam from the reheater to the intermediate pressure steam turbine.

7. The system of claim 1, wherein the one or more heat exchangers are configured to selectively receive the steam from a plurality of extraction locations via a plurality of valves controlled by the controller, wherein the plurality of extraction locations comprise a low pressure section of the HRSG, an intermediate pressure section of the HRSG, a high pressure section of the HRSG, a low pressure steam turbine, an intermediate pressure steam turbine, a high pressure steam turbine, a crossover line between steam turbines of the steam turbine system, or any combination thereof.

8. A system, comprising:

a gas turbine system;

a heat recovery steam generator (HRSG);

a steam turbine system;

a carbon capture system; and an intake heating system comprising one or more heat exchangers, wherein the one or more heat exchangers are configured to:

receive steam from the HRSG, the steam turbine system, or a combination thereof;

receive an air;

place the steam in a heat exchange relationship with the air to produce a heated air and a cooled steam;

send the cooled steam to the carbon capture system; and send the heated air to an injection location of the gas turbine system; and a controller comprising a memory and one or more processors, wherein the controller is configured to:

adjust one or more parameters of the steam to:

maintain a first temperature of the heated air between a first lower temperature threshold and a first upper temperature threshold; and maintain a second temperature of the cooled steam between a second lower temperature threshold and a second upper temperature threshold.

9. The system of claim 8, comprising one or more sensors configured to monitor one or more parameters of the cooled steam sent to the carbon capture system.

10. The system of claim 8, wherein the controller is configured to adjust one or more parameters of the heated air sent to the injection location.

11. The system of claim 8, wherein adjusting the one or more parameters comprises:

controlling one or more actuators to cause the steam to flow from a cross-over line to the one or more heat exchangers, wherein the cross-over line extends from an intermediate pressure steam turbine of the steam turbine system and a low pressure steam turbine of the steam turbine system;

controlling the one or more actuators to cause the steam to flow from one or more lines coupled to a high pressure steam turbine of the steam turbine, the intermediate pressure steam turbine, or a combination thereof, to the one or more heat exchangers;

or a combination thereof.

12. The system of claim 11, wherein the one or more lines comprise:

a first inlet line coupled to an inlet portion of the high pressure steam turbine;

a first outlet line coupled to an outlet portion of the high pressure steam turbine;

a second inlet line coupled to an inlet portion of the intermediate pressure steam turbine;

a second outlet line coupled to an outlet portion of the intermediate pressure steam turbine;

or a combination thereof.

13. The system of claim 12, wherein the first outlet line is configured to transfer the steam from the high pressure steam turbine to a reheater, and the second inlet line is configured to transfer the steam from the reheater to the intermediate pressure steam turbine.

14. The system of claim 13, wherein the first inlet line, the first outlet line, the second inlet line, the second outlet line, or the combination thereof, comprises one or more valves configured to regulate flow of the steam to the one or more heat exchangers, wherein the controller is configured to selectively actuate the one or more valves.

15. The system of claim 8, wherein the one or more heat exchangers are configured to selectively receive the steam from a plurality of extraction locations via a plurality of valves controlled by the controller, wherein the plurality of extraction locations comprise a low pressure section of the HRSG, an intermediate pressure section of the HRSG, a high pressure section of the HRSG, a low pressure steam turbine, an intermediate pressure steam turbine, a high pressure steam turbine, a crossover line between steam turbines of the steam turbine system, or any combination thereof.

16. A method, comprising:

receiving steam from a heat recovery steam generator (HRSG), a steam turbine system, or a combination thereof, into at least one heat exchanger of an intake heating system;

receiving an air into the at least one heat exchanger;

transferring heat from the steam to the air in the at least one heat exchanger to produce a heated air and a cooled steam;

sending the cooled steam to a carbon capture system;

sending the heated air to an injection location of a gas turbine system; and adjusting, via a controller, one or more parameters of the steam to:

maintain a first temperature of the heated air between a first lower temperature threshold and a first upper temperature threshold; and maintain a second temperature of the cooled steam between a second lower temperature threshold and a second upper temperature threshold.

17. The method of claim 16, comprising capturing a carbon dioxide ($CO_2$) from the air and/or an exhaust gas from the gas turbine system, wherein capturing comprises using the cooled steam during a desorption mode of the carbon capture system.

18. The system of claim 11, wherein adjusting the one or more parameters of the steam comprises:

controlling the one or more actuators to cause the steam to flow from the cross-over line to the one or more heat exchangers in response to the gas turbine operating at a full load; and controlling the one or more actuators to cause the steam to flow from the one or more lines to the one or more heat exchangers in response to the gas turbine operating at a part load.

19. The system of claim 1, wherein the injection location comprises an intake of the gas turbine system.

20. The system of claim 1, further comprising at least one of:

the steam turbine system;

the gas turbine system;

the carbon capture system; or the HRSG.

\*    \*    \*    \*    \*